L. BOIS FILS.
Manufacture of Illuminating Gas.

No. 149,978. Patented April 21, 1874.

UNITED STATES PATENT OFFICE.

LOUIS BOIS, FILS, OF LYONS, FRANCE.

IMPROVEMENT IN THE MANUFACTURE OF ILLUMINATING-GAS.

Specification forming part of Letters Patent No. 149,978, dated April 21, 1874; application filed December 4, 1873.

*To all whom it may concern:*

Be it known that I, LOUIS BOIS, Fils, of Montplaisir, Lyons, France, have invented an Improvement in the Manufacture of Illuminating-Gas, of which the following is a specification:

My invention relates to a new and improved method or process of manufacturing gas by the decomposition of water or steam; and it consists in subjecting the steam to the action of metallic iron or other suitable material and the carbonate of potash or soda at a proper temperature, as will be fully hereinafter described.

In carrying out my invention, I first cause the steam to circulate through a retort or series of retorts heated to a high temperature, and containing waste or scrap iron, whereby it is partially decomposed, part of its hydrogen being set free, the oxygen going to the iron, forming oxide of iron. I then pass the resulting gas, which will be mixed with undecomposed steam, into another retort or series of retorts containing carbonate of soda or potash, and heated to a high temperature, where the undecomposed steam will react upon said carbonate of soda or potash, forming an additional quantity of hydrogen gas, carbonic oxide, an inflammable gas, and caustic soda, a substance of great demand in the arts, the production of which will, in a great measure, defray the expense of the manufacture of the gas.

Figure 1:
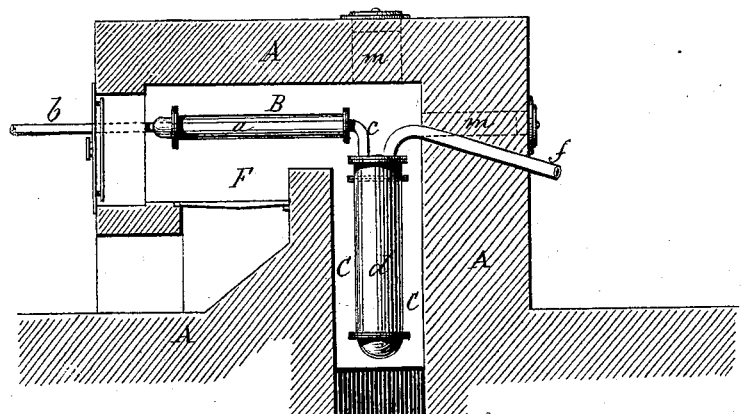
Figure 2:
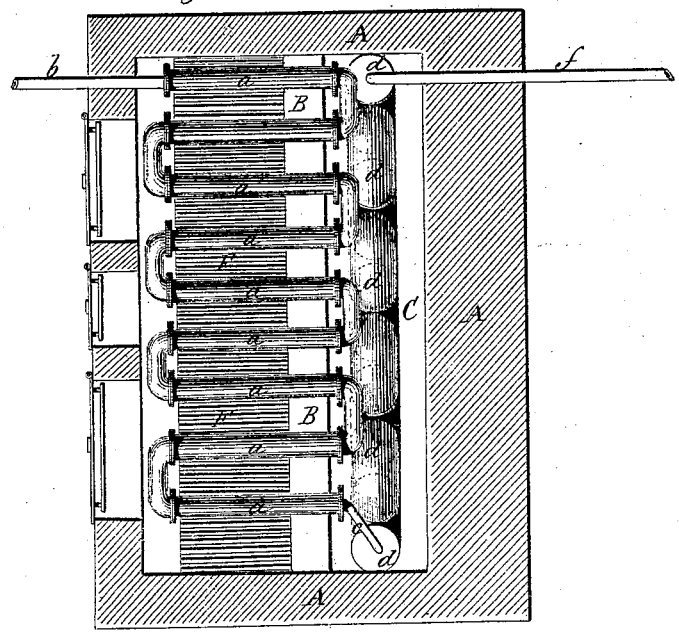

In the drawing, Figure 1 represents a vertical transverse section of the apparatus which I employ, and Fig. 2 a view of my apparatus with the top removed.

In a furnace, A, is arranged, over the grate-bars F, a series of horizontal serpentine or coiled tubes, $a\ a$, communicating at one end with a steam-pipe, $b$, and at the other, by means of a tube, $c$, with a series of pipes, $d\ d$, arranged vertically in a flue, C, of the furnace, and communicating, by means of a pipe, $f$, with a suitable condenser. The condenser leads, by means of a suitable pipe, to a gasometer, which it is not necessary to show.

The first series of tubes, $a\ a$, contain scrap-iron, and the second series, $d\ d$, carbonate of soda or potash, both series being heated to a temperature varying between a red and a white heat. These tubes or retorts are provided at their ends with movable joints, in order that they may be charged and cleaned when required.

The steam, when admitted to the first series of retorts, $a\ a$, on coming in contact with the heated scrap-iron, is partially decomposed, forming free hydrogen, the oxygen uniting with the iron, forming oxide of iron. The gas and undecomposed steam resulting from this decomposition are passed to retorts $d\ d$, where any undecomposed steam reacts upon the carbonate of soda or potash which they contain, forming carbonic oxide, caustic potash, and an additional quantity of hydrogen. The caustic potash is a valuable material in the arts, and the carbonic oxide is an inflammable gas, similar in its combustible properties to hydrogen, which can be utilized for heating and illuminating purposes, and can be collected, along with the hydrogen, for this purpose, in suitable gasometers.

In order to render the gases thus produced fit for perfect illuminating purposes, I charge them with the vapor of the various light hydrocarbons by any of the well-known methods.

What I claim is—

The process herein described of manufacturing gas for illuminating and heating purposes, and caustic soda or potash, by the double decomposition of steam and iron and the carbonates of potash or soda, substantially as herein described.

In testimony whereof I have signed my name to this specification before two subscribing witnesses.

L. BOIS, FILS.

Witnesses:
P. DUGUAIRE,
ALBERT COHEN.